FIG. 1

INVENTORS
W. E. HORN
J. C. HUFFMAN
BY R. P. Miller
ATTORNEY

INVENTORS
W. E. HORN
J. C. HUFFMAN
BY R. P. Miller
ATTORNEY

June 9, 1964 W. E. HORN ETAL 3,136,042
APPARATUS FOR CAPPING THE ENDS OF A COMPONENT
Filed March 15, 1962 8 Sheets-Sheet 5

INVENTORS
W. E. HORN
J. C. HUFFMAN
BY R. P. Miller
ATTORNEY

June 9, 1964      W. E. HORN ETAL      3,136,042
APPARATUS FOR CAPPING THE ENDS OF A COMPONENT
Filed March 15, 1962      8 Sheets-Sheet 6

INVENTORS
W. E. HORN
J. C. HUFFMAN
BY R. P. Miller
ATTORNEY

FIG. 18

3,136,042
APPARATUS FOR CAPPING THE ENDS OF
A COMPONENT
William E. Horn and John C. Huffman, both of Winston-Salem, N.C., assignors to Western Electric Company, Incorporated, New York, N.Y., a corporation of New York
Filed Mar. 15, 1962, Ser. No. 179,995
5 Claims. (Cl. 29—203)

This invention relates to apparatus for assembling and securing components and more particularly to a mechanism for assembling and securing capped electrical components.

In the manufacture and assembly of electrical components, it is necessary to determine if certain elements of the components are properly assembled. More particularly, in the manufacture of electrical components such as cylindrical deposited carbon resistors wherein cup-shaped caps are forced onto the opposite ends of the resistor, it is necessary to determine if the frictional bond between the caps and the resistors exceeds a predetermined minimum value.

An object of this invention is to provide a new and improved apparatus for assembling and securing components.

Another object of this invention is to provide a mechanism for assembling and securing capped electrical components in accordance with certain characteristics of a force-fit bond between the caps and the components.

With these and other objects in view, the present invention contemplates a feeding facility, wherein a chute feeds a first article into a nest. A pair of chucks are provided with a recess for receiving a second article having a predetermined orientation. A mechanism advances the nest and chucks into alignment with the chute and then another mechanism, actuated by the advancing mechanism, transfers the first article from the chute into the nest. Also, a control device provided with a head, moved by the transferring mechanism into engagement with the second article determines if the second article is in the predetermined orientation. Then, a device, rendered effective upon the head ascertaining that the second article is not in the predetermined orientation, interrupts the operation of the transferring mechanism to preclude transfer of the first article from the chute into the nest.

Other objects and advantages of the present invention will be apparent from the following detailed description when considered with the accompanying drawings illustrating a preferred embodiment thereof, in which.

Figure 5:
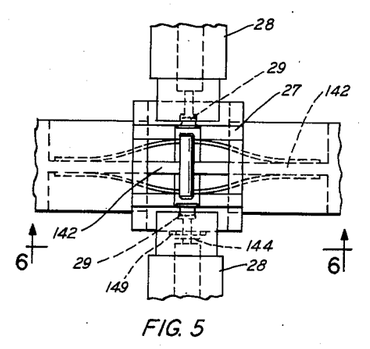
FIG. 5 is a partial plan view taken on line 5—5 of FIG. 3 showing the details of a nest wherein a carrier wheel is provided with slots for slidably receiving the nesting plates and a leaf spring urges the plates outwardly against a stop pin.
Figure 6:
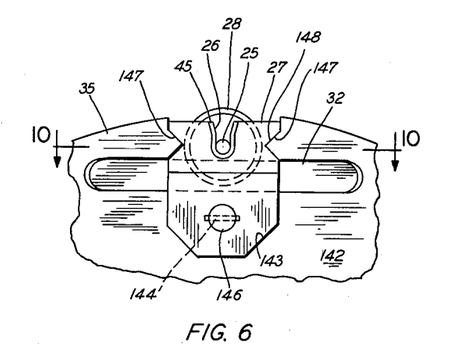
FIG. 6 is a front view of the disclosure of FIG. 5 showing opposed grooves formed in the nest plates and a rod for guiding sliding movement of the nest plates in the slot.
Figure 10:
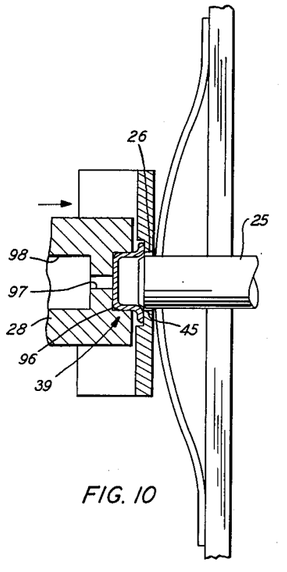
FIG. 10 is a sectional view taken on line 10—10 of FIG. 6 showing a capping head advancing toward the component supported by the nesting plates wherein the flanges of the cap engage and urge the nesting plates inwardly against the action of the leaf springs so that the caps are forced onto the ends of the component.

Referring in detail to FIG. 6 of the drawings, an uncapped cylindrical component or deposited carbon resistor core 25 is shown supported in slots 26 provided in a nest or pair of nesting plates 27. For applying caps to the ends of the component 25, capping heads 28 (FIG. 5), mounted on opposite sides of the plates 27, advance caps 29 toward the component. As shown in FIG. 10, the caps 29 engage and move the plates 27 toward each other so that the ends of the component 25 gradually extend through the slots 26. As the caps 29 are further advanced inwardly and are forced onto the ends of the component 25, leaf springs 32 are compressed. After the capping heads 28 are retracted, the leaf springs 32 force the plates 27 outwardly so that the capped component is held by the flanges 33 of the caps 29 in the slots 26 of the nesting plates 27.

Figure 2:
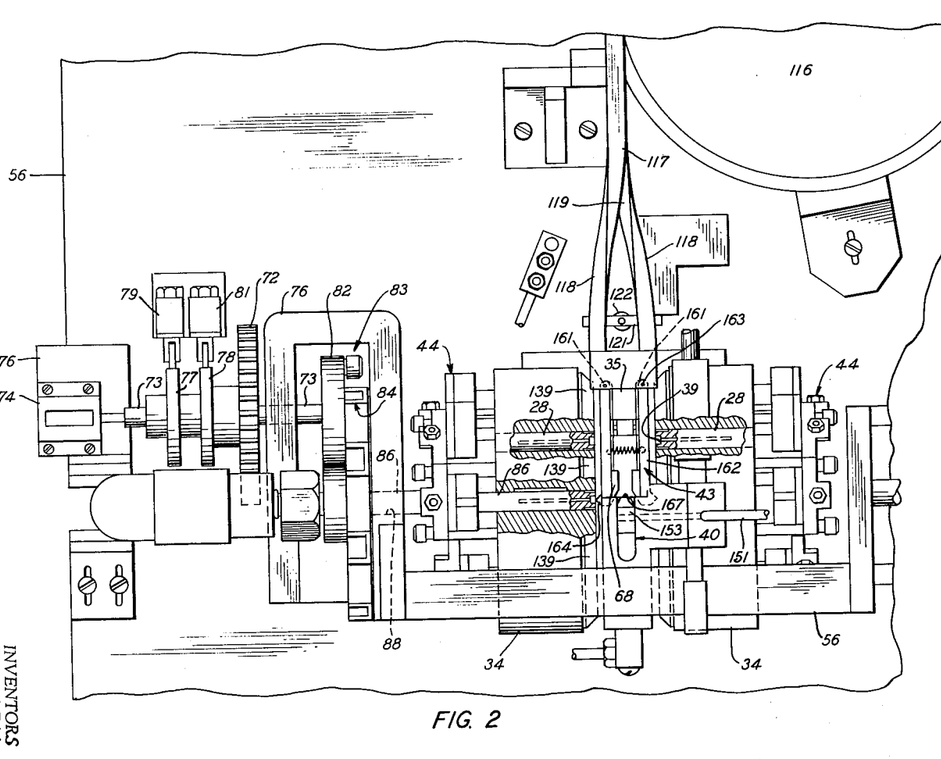
FIG. 2 is a partially sectioned top view of the mechanism of FIG. 1 particularly illustrating a vibratory hopper and a dual track feed chute for feeding terminal caps to a mechanism which advances the caps into vacuum chucks provided in each of eight pairs of opposed capping heads.
Figure 3:
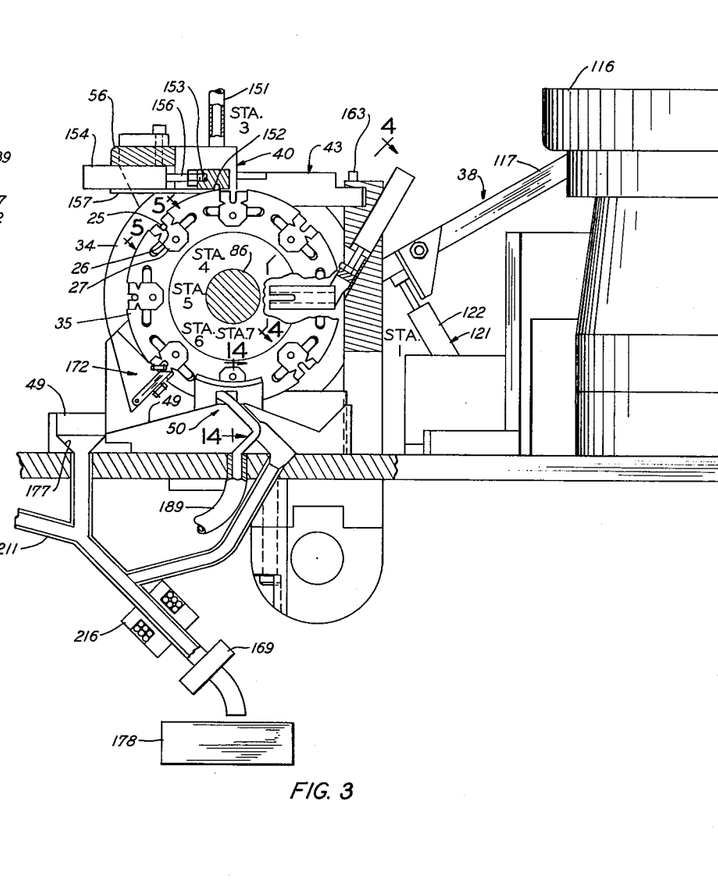
FIG. 3 is a cross-sectional view taken on line 3—3 of FIG. 1 showing a series of nests for supporting a component between each pair of capping heads wherein a device for feeding components into the nests is controlled by a test mechanism that checks the orientation of the caps in the vacuum chucks.
Figure 4:
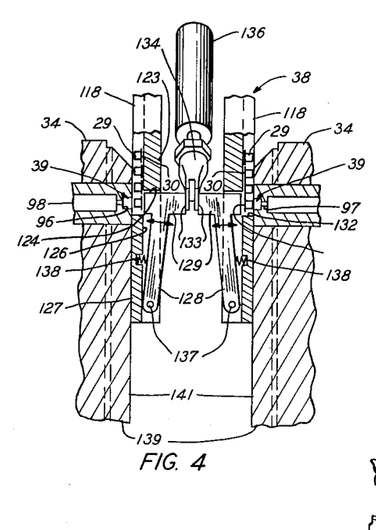
FIG. 4 is a sectional view taken along lines 4—4 in FIG. 3 illustrating a pair of cap insert fingers which are actuated by a cam for moving through the terminal end of the feed tracks to advance a cap into a pair of capping heads.

For a general description of the apparatus, attention is now directed to FIG. 2 wherein one of eight opposed pairs of capping heads 28 is shown slidably received in each of two wheels 34 mounted on opposite sides of a carrier plate 35. The carrier plate 35 supports a pair of the nesting plates 27 between and in alignment with each opposed pair of capping heads 28. The wheels 34 and the carrier plate 35 are indexed simultaneously so that each aligned pair of capping heads 28 and nesting plates 27 forms a capping unit. Referring to FIGS. 3 and 4, the capping units 37 are indexed to station 1 where a cap-feeding device 38 advances a cap into each capping head 28. The capping units 37 are then advanced past station 2 to station 3. At the start of the advancement between stations, vacuum chucks 39 provided in the capping heads 28 are rendered effective to hold each cap firmly in the capping heads.

Figure 8:
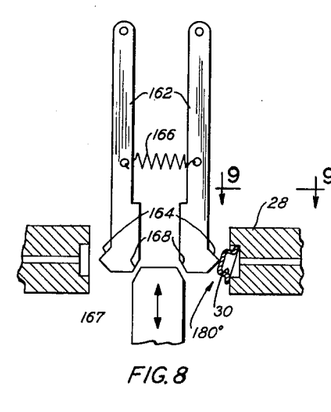
FIG. 8 is a partial plan view of the disclosure of FIG. 7 showing the cap alignment tester arms rotated apart by the feed slide cam so that a conical test head provided on each of the arms engages a cap shown 180 degrees out of position in the vacuum chuck.

At station 3, a core-feed device 40 is actuated for dispensing a core 25 into one of the slots 26 provided in the nesting plates 27. During the first part of its movement, the core-feed device 40 actuates a cap alignment tester 43 which aligns and ascertains the orientation of the caps 29 held in the vacuum chucks 39 of the capping heads 28. If it is ascertained that the open ends 30 of the caps 29 do not extend from the capping heads 28 (as shown in FIG. 8), the tester 43 interrupts operation of the core-feed device 40 so that a core 25 is not dispensed into the corresponding nesting plate slots 26.

After it has been determined that the caps 29 are in proper orientation in the vacuum chuck 39 and a core 25 has been fed into the nesting plate slot 26, the capping unit 37 is indexed toward station 4 where a barrel cam device 44 (FIG. 1) is effective to advance the capping heads 28 toward the nesting plates 27. As shown in FIG. 10, the caps 29 engage a recess 45 provided in the nesting plates 27 and are thereby further aligned in the vacuum chuck 39.

The capping unit 37 is then indexed further to station 5 whereupon the barrel cam device 44 is effective to advance the opposed capping heads 28 further toward each other to perform the above-described capping operation. Just prior to the completion of the indexing movement to station 5, the barrel cam device 44 is also effective to operate a vacuum control valve 46 for admitting atmospheric pressure to the vacuum chuck 39 so that the caps 29 may easily be removed from the capping heads 28 during the capping operation.

The capped cores 25 are then advanced toward station 6 during which time the leaf springs 32 urge the nesting plates 27 outwardly and apply on the caps 29 a predetermined force tending to remove the caps from the core. If the frictional engagement between the caps and the core is satisfactory, the thus "accepted" capped core 48 (FIG. 11B) is held in the nest 27 by the action of the springs 32. However, if there is a defective engagement, the springs 32 are effective to remove the cap 29 from the core 25 so that the core falls out of the slot 26 into a chute 49.

When a capping unit 37 that holds an accepted capped core 48 reaches station 6, a stripper 50 (FIG. 16) releases the accepted capped core from the grip of the nesting plates 27 whereupon the capped core drops through a second chute 51 and advances to the next machine on the assembly line.

Figure 1:
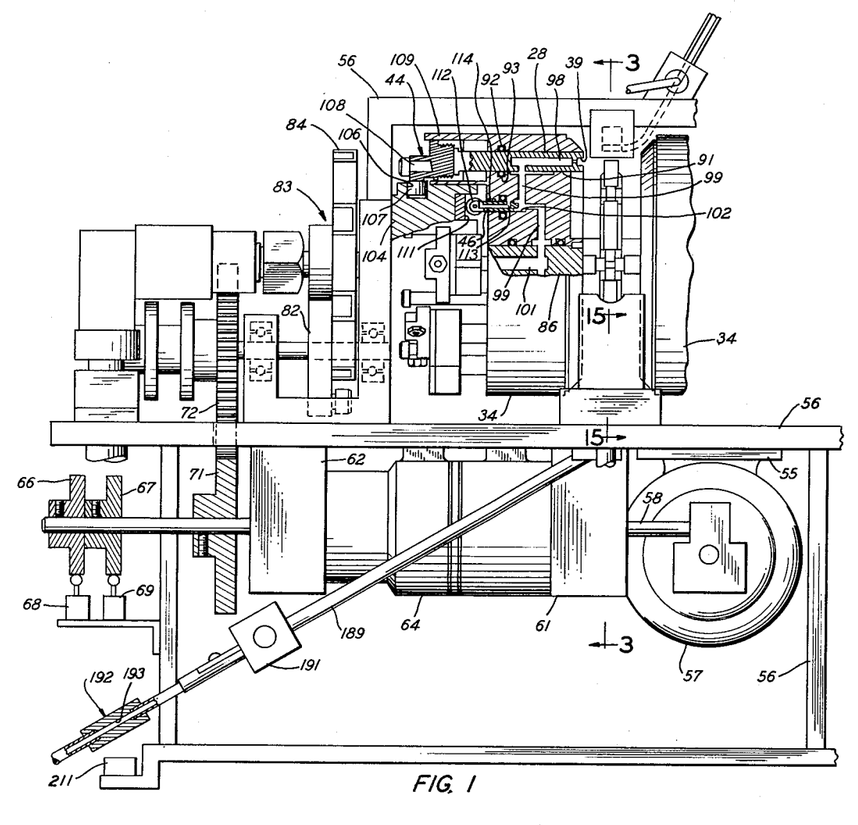
FIG. 1 is a side elevational view of a mechanism for force-fitting terminal caps onto the ends of a component according to the invention.

Referring now to the details of the apparatus, in FIG. 1, a bracket 55 is shown mounted to a frame 56 for supporting a drive motor 57. A shaft 58 is driven by the motor 57 for rotating the clutch plate (not shown) of an electromagnetic clutch 61. Upon suitable actuation of the electromagnetic clutch 61, the clutch plate rotates a second shaft 62 supported in journals 63 that depend from the frame 56. An electromagnetic brake 64 supported on the frame 56 adjacent to the clutch 61 is energized alternately with the clutch for preventing rotation of the second shaft 62 at certain times during the operation of the capping mechanism. At the left extremity of the second shaft 62, switch operating cams 66 and 67 are keyed to the shaft. Switches 68 and 69 are actuated by the cams 66 and 67 in a predetermined sequence for controlling certain operations of the capping mechanism.

A gear 71 (see also FIG. 2) is also keyed to the second shaft 62 for driving a gear 72 that is keyed to a shaft. The shaft 73 is mounted for rotation on the frame 56 on bearings 74 that are mounted on supports 76. Cams 77 and 78, keyed to the shaft 73, actuate a pair of pneumatic valves 79 and 81 for controlling certain operations of the capping mechanism. A crank arm or pin wheel 82 of a Geneva drive mechanism 83 is keyed to the shaft 73 for driving a star wheel 84. The star wheel 84 is keyed to a main indexing drive shaft 86 that is mounted for rotation in spaced journals 88 supported on the frame 56. It may be appreciated that upon de-energization of the brake 64 and energization of the drive motor 57 and the clutch 61, the first drive shaft 58 rotates the shaft 62 for actuating the Geneva drive 83 which indexes the main indexing drive shaft 86.

Referring to FIG. 2, the opposed capping head wheels 34 are shown keyed to the main indexing drive shaft 86. In FIG. 1, the details of only one of the capping head wheels 34 are shown for simplicity inasmuch as both of the wheels are identical. A capping head 28, which may be cylindrical in shape, is slidably received in each of eight circular apertures 91 that are formed through the wheels 34 parallel to the indexing drive shaft 86. Sealing rings 92, such as standard O rings, are received in annular recesses 93 machined in the circular apertures 91 to provide an air-tight seal between the wheels 34 and the capping heads 28.

Referring to FIG. 10, a recess 96, which forms the vacuum chuck 39 is shown machined in one of the capping heads 28 for receiving a cap 29 which is to be forced onto one end of a resistor core 25. A bore 97 machined coaxially within a portion of the cylindrical capping head 28 communicates with the vacuum chuck recess 96 and with a slot or vacuum chamber 98 (FIG. 1) that is machined in the wheel 34. A radial vacuum bore (FIG. 1) or main vacuum path 99 also machined in the indexing wheel 34 extends from the vacuum chamber 98 for a central vacuum bore 101 formed in the indexing drive shaft 86. Intermediate the ends of the radial vacuum bore 99, the vacuum control valve 46 is slidably received within an aperture 102 that is machined in the wheel 34. At the time that a cap 29 is inserted in the vacuum chuck recess 96, the valve 46 is in a retracted or open position so that the central vacuum bore 101 communicates with the vacuum chuck bore 98. The vacuum chuck 39 is thereby effective to hold a cap 29 in the recess 96.

As the wheels 34 are successively indexed through stations 1 through 7, the barrel cam mechanism 44 advances each opposed pair of capping heads 28 towards each other for forcing the caps 29 onto the ends of the resistor core 25 and at the same time operates the vacuum control valve 46. The barrel cam mechanism 44 includes a cylindrical barrel cam 104 that is fixedly mounted to the frame 56. A recessed cam track 106 provided in the barrel cam 104 receives a cam follower 107 that depends from a slide 108. An arm 109 provided on the wheel 34 supports the slide 108 so that reciprocatory movement of the cam follower 107 is transmitted through the slide to the capping head 28.

At the same time that the slides 108 advance the capping heads 28 towards each other, a second cam surface 111 provided on the vertical face of the barrel cam 104 is effective to advance a second cam follower 112 to the left. Advancement of the second cam follower 112 to the left slides the valve 46 to the left into a closed position within the aperture 102 for cutting off the vacuum supply to the chamber 98. A bore 113 machined in the center of the valve 46 communicates with a cutout 114 provided in the aperture 102 for bleeding atmospheric pressure into the outer radial portion of the bore 99 so that a cap 29 received in the recess 96 is released and may easily be removed therefrom when the capping heads 28 are retracted from the capping position.

Referring to FIGS. 2 and 3, a vibratory feed 116, such as one of the types manufactured by the Syntron Company, Homer City, Pennsylvania, is shown for supplying caps 29 to a double-track feed chute 117. The tracks 118 of the feed chute 117 separate at a fork 119 for advancing a single line of caps 29 to each of the two capping head wheels 34. Just below the fork 119 a hammer mechanism 121 is mounted to the frame 56. The cam 77 actuates the pneumatic valve 79 for supplying air pressure to an air cylinder 122 that reciprocates the hammer 121. The hammer 121 thereby periodically taps the feed chutes 117 to assist passage of caps 29 along the feed tracks. The caps 29 are thus advanced in each of the feed tracks 118 with the open or flanged ends 30 thereof facing the open ends 39 of the caps in the other feed tracks 118 (FIG. 4).

Still referring to FIG. 4, the terminal end 123 of each of the feed tracks 118 is shown provided with an aperture 124 machined perpendicular to the walls 126 and in alignment with the vacuum chuck recess 96 of a capping head 28 that has been indexed to station 1. An extending portion 127 of the terminal end 123 of each track 118 pivotally supports a cap insert finger 128 that is provided with a generally T-shaped head 129. A surface 131 of one end of each head 129 is normally flush with the inner surface of each wall 126 of the feed track 118 so that the caps 29 may fully advance through the feed tracks into abutment with the ends 132. A cam follower 133 is formed on the other end of each head 129 for cooperation with a finger-actuating cam 134 that is reciprocated by an air cylinder 136. The cam 78 that is driven by the drive shaft 73 actuates the pneumatic valve 81 for supplying air pressure to the air cylinder 136. Actuation of the air cylinder 136 moves a piston rod (not shown) for advancing the finger-actuating cam 134 downwardly (as shown in FIG. 4). The finger-actuating cam 134 moves the cam follower portion 133 of each of the heads 129 to pivot the fingers on a pin 137. The fingers 128 advance the ends of the head 129 toward the apertures 124 and into engagement with the flanged end 30 of the lowermost cap 29 in each feed track 118. The caps 29 are thereby advanced through the aperture 124 in the outer wall 126 of each feed track 118 and into the vacuum chucks 39 of the capping heads 28.

As noted above, the vacuum-control valve 46 is open at this time so that a reduced pressure is applied to the bore 97 and the recess 96 of the vacuum chuck 39. Thus, once the fingers 128 are actuated to advance the caps 29 from the feed tracks 118, the caps are firmly held in the vacuum chucks 39. The air cylinder 136 is then reversed to retract the cam 134 whereupon compression springs 138 are effective to rotate each of the fingers 128. Rotation of the fingers 128 moves the end surfaces 131 of each of the heads 129 out of the feed track 118 whereupon the caps 29 in each of the feed tracks advance downwardly so that the lowermost caps are in engagement with the terminal end 132 of the feed tracks.

Upon the next indexing movement of the Geneva drive 83, the capping heads 28 that have just received caps 29 are indexed to station 2 and empty capping heads are indexed to station 1. A bridge 139 (FIG. 2) is mounted on the wheels 34 between each of the capping heads 28. The surfaces 141 of the bridges 139 are flush with the faces of the capping heads 28 when the heads are in their normal retracted position shown in FIG. 4. Thus, during the indexing movement of the wheel 34, the bridge 139 blocks the aperture 124 in the outer wall 126 of each of the feed tracks 118 to preclude advancement of caps 29 through the apertures 124.

After the cap-feeding mechanism 38 has inserted caps 29 into the vacuum chucks 39 of the empty capping heads 28, the now loaded capping heads are indexed to station 2 and the previously loaded capping heads are indexed to station 3. The core-feed device 40 and the cap-aligner mechanisms 43 are mounted to the frame 56 at station 3. The core-feed device 40 dispenses a core 25 into a core-holding nest 27 that has been indexed to station 3 by the carrier plate 35.

Referring to FIG. 3, eight core-holding nests 27 are shown slidably mounted at equal intervals in the periphery of the carrier plate 35. The carrier plate 35 is keyed to the main indexing drive shaft 86 and centered between the capping head wheels 34 so that each core-holding nest 27 is registered with and centered between one of the pairs of opposed capping heads 28. Each registered pair of capping heads 28 and core holding nest 27 or capping unit 37 is advanced from station to station when the main indexing drive shaft 86 indexes.

Figure 14:
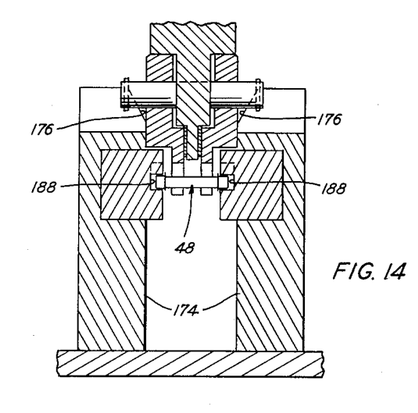
FIG. 14 is a cross-sectional view taken along line 14—14 of FIG. 3 showing a pair of opposed cams engaged to and urging the nest plates inwardly to release the capped component.

Referring to FIGS. 5, 6, and 14, one of the core-holding nests 27 is shown mounted to the carrier plate 35. The core-holding nest 27 includes a peripheral flange 142 that is formed integrally with the carrier plate 35. Eight pairs of slots 143 are machined on opposite sides of the flange 142 for slidably receiving the pairs of nesting plates 27. Guide rods 144 welded or otherwise fixed to the opposed vertical walls of the slots 143 are received in apertures 146 formed in each of the nesting plates 27. V-shaped guide surfaces 148 formed in the slots 143 and the guide rods 144 cooperate with respective V-shaped recessed surfaces 148 and the apertures 146 provided in the nesting plates 27 for guiding the nesting plates as they slide in the slots 143. One of the leaf springs 32 is mounted to the inner surface of each of the nesting plates 27 and engages the opposite sides of the flange for urging the plates 27 outwardly against stop pins 149 which limit the outward movement of the nesting plates 27.

The slots 26 are machined in the upper surface of each of the nesting plates 27 for receiving a core 25 that is dispensed from the core-feed device 40. A recess 45 (FIG. 10) is machined in the outer face of each of the nesting plates 27 on opposite sides of the slot 26 for receiving the flanged portions 30 of a cap 29 that is advanced by the capping heads 28 toward and for assembly with a core 25 received in the slots.

Figure 7:
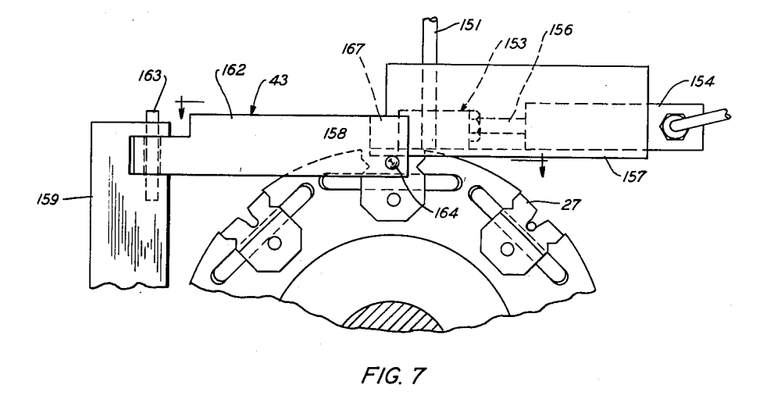
FIG. 7 is an enlarged view of a portion of the disclosure of FIG. 3 showing a component feed slide movable into successive alignment with a component feed chute and a component feed slot wherein a cam-actuated component of the feed slide toward the feed slot rotates a cap alignment tester arm to ascertain the orientation of a cap received in the capping head.
Figure 17:
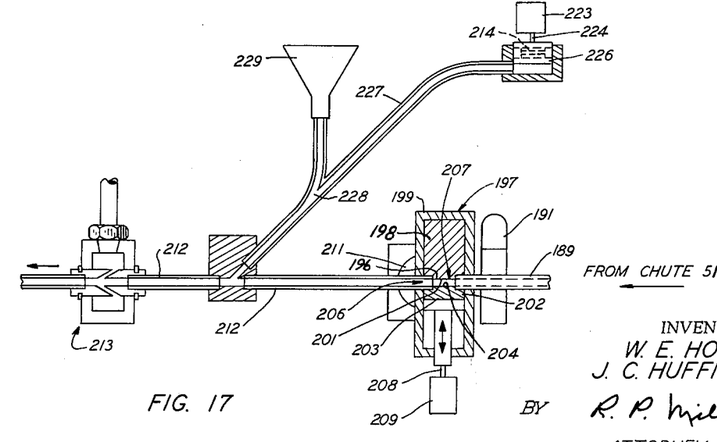
FIG. 17 is an elevational sectional view of an extension of the discharge chute shown in FIG. 1 illustrating a device for gaging the capped components and removing from the chute components having distorted caps.

When the indexing drive shaft 86 has indexed a loaded pair of capping heads 28 and an unloaded nest 27 to station 3, the core-feed device 40 is actuated. Referring to FIGS. 2, 3 and 17, the core-feed device 40 is shown including a core supply chute 151 supported on the frame 56 for feeding cores 25 to a groove 152 provided in a core-feed slide 153. An air cylinder 154 mounted on the frame 56 is actuated by the valve 79 for reciprocating a piston rod 156 connected to the core-feed slide 153. The piston rod 156 advances the core-feed slide 153 to the left as viewed in FIG. 3 on a support plate 157 to align the groove 152 with the bore of the feed chute 151 whereby the groove receives one core from the feed chute. The feed slide 153 is then advanced to the right (as shown in FIG. 7) to align the groove with a feed slot 158 formed through the support plate 157. In this manner, in the normal operation of the capping mechanism, each time a core-holding nest 27 is indexed into alignment with the support plate feed slot 158, the air valve 81 actuates the air cylinder 154 which advances the piston rod 156 for reciprocating the feed slide 153 on the support plate 157 so that a core 25 is dispensed into the core-holding nest 27.

However, if a cap 29 is improperly received in the vacuum chuck 39 (FIGS. 9 and 10), the cap alignment tester 43, which is actuated by the core-feed slide 153, is effective to interrupt the rightward advancement of the core-feed slide on the support plate 157 before a core 25 is dispensed through the feed slot 158.

Figure 9:
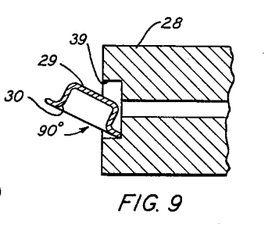
FIG. 9 is a view taken along line 9—9 of FIG. 8 showing a cap received 90 degrees out of desired position in a capping head.

The cap alignment tester 43 (shown in FIGS. 2, 7, and 8) includes a vertical support plate 159 that is fixed to the frame 56. Spaced recesses 161 (FIG. 7) machined in the support plate 157 each receive one end of an arm 162 that is mounted for rotation on a pivot pin 163. A conical head 164 mounted to the other end of each of the arms faces and is in alignment with the vacuum chuck recess 96 of each of the capping heads 28 that have been indexed to station 3. A tension spring 166 interposed between the arms 162 urges the arms toward each other against the action of a cam actuator 167 that is formed on the core-feed slide 153. Cam surfaces 168 provided on the free ends of the arms 162 cooperate with the cam actuator 167 to pivot the arms outwardly away from each other against the force of the spring 166 when the core-feed slide 153 is advanced to the right as shown in FIG. 3. Outward movement of the arms 162 rotates or advances the conical heads 164 into engagement with the caps 29 held in the capping heads 28. If the caps 29 are properly oriented or received in the capping heads 28 (as shown in FIG. 10), the conical heads 164 press the cap 29 firmly into the recess 96 of the capping head 28. If, however, a cap 29 has been inserted in the recess 96 of the cap head 28 90 degrees or 180 degrees out of proper orientation, as shown in FIGS. 8 and 9, the conical head 164 cannot enter the open end 30 of the cap 29, but will engage either the side wall or the closed end of the cap. The cam-actuator head 167 is thus precluded from moving through its full outward stroke and prevents the cam surfaces 168 from moving outwardly under the action of the cam actuator 167. The cam actuator 167 thus becomes wedged between the cam surfaces 168 so that the advancement of the cam actuator to the right is interrupted. Therefore, the groove machined in the core-feed slide 153 does not advance into alignment with the feed slot 158 so that a resistor core 25 that has been fed into the groove 152 will not advance through the slot 158 into the nesting plates 27 when a cap 29 is improperly aligned in either of the capping heads 28.

Assuming that the apparatus has performed normally thus far, the capping unit 37 located at station 3 will have a core 25 received in the slots 26 of the core-holding nest 27 and a cap 29 received in each vacuum chuck 39 of the capping heads 28.

The Geneva drive 83 is then rendered effective for indexing the carrier plate 35 and the wheels 34 to advance the capping unit 37 to station 4. During the advancement, barrel cam track 106 actuates the cam followers 107 for advancing the capping heads 28 toward each other until the caps 29 engage and move the nesting plates 27 slightly inward (FIG. 10). The resistance of the leaf springs 32 to such inward movement of the nesting plates 27 is sufficient to effectuate a final alignment or "squaring" of the caps 29 in the vacuum chucks 39.

Figure 11A:
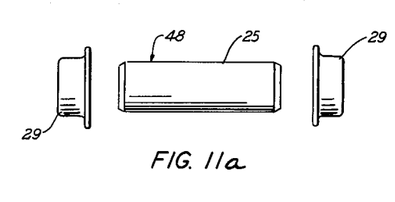
FIG. 11A is an exploded view of a pair of caps and a component which may be assembled by the apparatus shown in the other views.
Figure 11B:
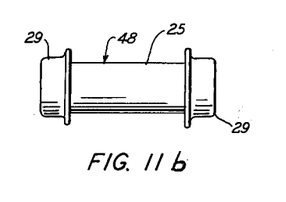
FIG. 11B is a view showing the caps shown in FIG. 11A assembled on the component.

The Geneva drive 83 then indexes whereupon the "squared" caps 29 and the core 25 are advanced to station 5. During the advancement of the capping unit 37 to station 5, the barrel cam track 106 actuates the cam followers 107 for further advancing the capping heads 28 to perform the capping operation. As the capping heads 28 advance inwardly against the force of the leaf springs 32, the tapered ends of the core 25 protrude through the slots 26. The caps 29 are then forced onto the protruding or exposed ends of the core 25. At the end of the capping stroke, the caps 29 are fully advanced onto and are held by frictional engagement on the ends of the core 25 as shown in FIG. 11B. At this time the barrel cam surface 111 has closed the vacuum control valve 46 and has vented the vacuum chuck bore 97 to the atmosphere for releasing the grip of the vacuum chucks 39 on the caps 29.

Figure 12:
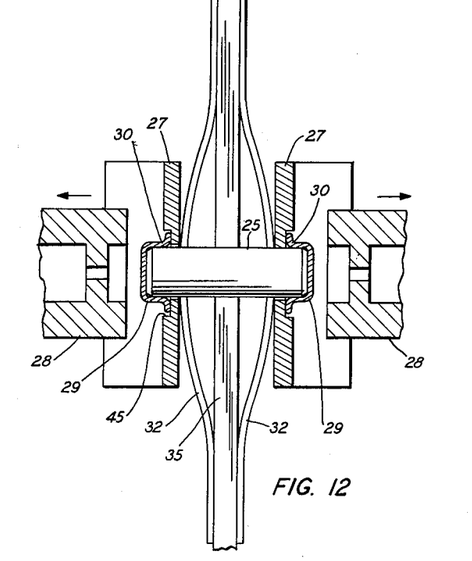
FIG. 12 is similar to FIG. 10 showing the leaf springs urging the nest plates outwardly against the caps on a component so that an improperly applied cap is forced off the end of the component.

As the capping unit 37 is indexed toward station 6, the barrel cam mechanism 44 is effective to retract the capping heads 29 so that the heads are no longer in engagement with the caps 29. At this time (see FIG. 12), the leaf springs 32 urge the nesting plates 27 outwardly against the flanges 30 of the caps 29 and apply a predetermined testing force against each of the caps which tends to remove the caps from the resistor core 25. If the caps 29 have been properly assembled with the resistor core 25 (to form the "accepted" capped core 28), the frictional force holding the caps on the core exceeds the predetermined force applied by the leaf springs 32 on the nesting plates 27 so that the caps 29 are not removed from the ends of the core 25.

However, if one of the caps 29 is too large or the resistor core 25 too small, an inadequate frictional engagement is produced, at which time the predetermined force exerted by the leaf springs 32 exceeds the inadequate frictional force. The nesting plates 27 are thus permitted to advance outwardly to remove the loose cap 29 from the defectively capped core 25. Because the testing operation has occurred between stations 5 and 6, and further because at this time the slots 26 in the nesting plates 27 open downwardly, the now partially uncapped core 25 is not held in the nest 27, but rather drops into a defectively capped core-receiving chute 49. As the defectively capped core 25 advances through the chute 49, a photoelectric device 169 is actuated for energizing certain of the control circuits shown in FIGS. 18 and 19. The control circuits are then effective to actuate a counter 171. If the counter 171 records a predetermined time interval, another control circuit is energized for energizing the brake 64 and deenergizing the clutch coil 61 to stop the capping mechanism.

Figure 15:
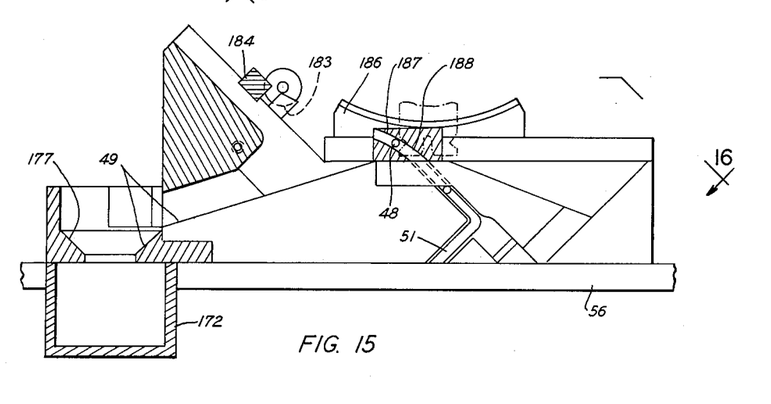
FIG. 15 is a cross-sectional view taken on line 15—15 of FIG. 1 showing a stripper mechanism for removing caps lodged in the vacuum chucks together with a discharge chute for feeding such caps into a receptacle.
Figure 16:
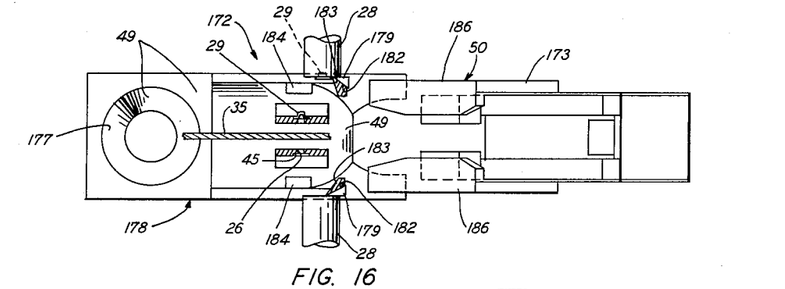
FIG. 16 is a top view of the stripper mechanism disclosed in FIG. 15.

In the description of the cap alignment tester 43, it was noted that the tester is effective to preclude the core-feed slide 153 from dispensing a core 25 into the nesting plates 27 in the event that one cap is not properly aligned in one of the vacuum chucks 39 of the capping heads 28. During the advancement of a capping head 28 having an improperly aligned cap 29 received in its vacuum chuck 31, from station 3 to station 6, the barrel cam mechanism 44 is effective to advance the capping heads 28 together to effect what normally would be the capping operation. If the improperly aligned caps 29 are not removed from the vacuum chucks 39 before the capping heads 28 are thus advanced, the improperly aligned cap may become lodged in the slot 26 of the nesting plate 27 or the cap may be retained in the vacuum chuck recess 96. To prevent this condition, a reject stripper mechanism 172 (FIGS. 15 and 16) is effective to forcibly remove the caps 29 from the vacuum chucks 39 and the core-holding nests 27 before the capping heads 28 are indexed to station 1. Referring to FIGS. 3, 15, and 16, the reject stripper mechanism 172 is shown mounted beneath the path assumed by the wheels 34 when the wheels are indexed from station 5 to station 6. The reject stripper mechanism 172 includes a base 173 mounted on the frame 56 beneath the lowermost point of the path of rotation of the carrier plate 35 and the wheels 34. Opposed vertical walls 174 (FIG. 14) extend upwardly from the base 173 and are provided with inwardly tapering inner wall surfaces 176 that deflect defective caps 29 or cores 25 inwardly toward the defective core-receiving chute 49 which feeds the parts into a funnel 177 for further advancement into a receptacle 178.

Stripper blades 179 are mounted to the upper surface of each of the walls 174. As the capping heads 28 are advanced toward station 6 by the wheels 34, a knife-edge portion 182 of each of the blades 179 engages and removes an improperly oriented cap 29 from its lodged position in the vacuum chucks 39 (see particularly FIG. 16). It is remembered that at this time the barrel cam mechanism 44 is effective to maintain the vacuum control valve 46 closed so that the improperly oriented cap 29 is held in the vacuum chuck solely by mechanical rather than pneumatic forces. A stapered surface 183 of the knife edge 179 directs a cap 29 so removed onto the tapered surface of the walls 176 so that the cap advances through the chute 49 and into the receptacle 178. Thus, an improperly oriented cap 29 that was retained or lodged in the vacuum chuck 39 of the capping head 28 during advancement from station 5 to station 6, is removed by the stripper blades 179 from the chuck 39 to condition the chuck for receiving caps 29 upon subsequent indexing to station 1.

If, however, the improperly oriented cap 29 was forced into and retained in the recess 45 or slots 26 of the nesting plates 27 at station 5, a pair of opposed resilient strippers 184 mounted to the walls 174 are effective to remove the caps 29 from the nesting plate slots 26 (FIGS. 15 and 16). As the nesting plates 27 are indexed from station 5 to station 6, the leading inward surfaces of the resilient strippers 184 engage the cap 29 as shown in FIG. 16 and forcibly eject the cap 29 from the recess 45. The cap 29 drops onto the sloping surface of the chute 49 and advances into the receptacle 178.

Assuming that the capping mechanism has operated normally and that therefore an "accepted" capped resistor core 48 is held in the slots 26 by the nesting plates 27, the carrier plate 35 advances the capped core 48 to an accepted capped core stripper 50 that is also mounted on the base 173 at station 6. The "accepted" core stripper 50 includes a pair of opposed cam plates 186 that extend upwardly from the base 173 and straddle the outer surfaces of the nesting plates 27 as shown in FIG. 14. The cam plates 186 are so designed as to move the nesting plates 27 inwardly against the force of the leaf springs 32 so that the recessed portions 45 of the nesting plates 27 are moved out of engagement with the flanges of the caps 29. During such inward advancement of the nesting plates 27, the accepted core 48 is advanced by the nesting plates into opposed curvilinear cam tracks or guides 187 (FIG. 15) machined in the base 173. Thus, as the accepted core 48 is released from the nesting plates 27, it drops onto and is supported by the lower surface of the guides 187. The nesting plates 27 are indexed further to advance the accepted capped core 48 into an oppositely curved portion 188 of the cam track 187 which positively removes the capped core 48 from the slots 26 of the nesting plates 27 into an accepted core chute 51 formed through the base 173. The accepted core 48 advances through the accepted core chute 51 and into an accepted core feed tube 189 attached to the base 173. The accepted core 48 advances in the feed tube 189 past a photocell 191 to a test fixture 192.

Figure 13:
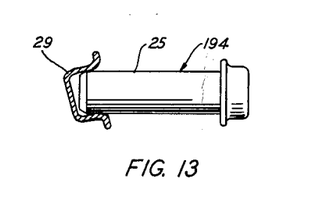
FIG. 13 is a view of a component having a cap that has been distorted during the capping operation.

The test fixture 192 (FIG. 1) has a bore 193 formed therein of a predetermined diameter for precluding passage of a "distorted" capped core 194 which may be an otherwise accepted core 48 having a cap 29 that has been distorted (as shown in FIG. 13) during the capping operation. The bore 193 of the fixture 192 is blocked by the distorted capped core 194 so that subsequently capped cores will back up in the tube 189 until the light path of the photocell 191 across the tube is blocked. The photocell 191 is then effective to energize certain of the control circuits shown in FIGS. 18 and 19 for stopping the capping machine. An operator may then at this time remove the distorted capped core 194 from the test fixture 192 and restart the operation of the capping machine.

An alternate embodiment for testing for distorted capped cores is shown in FIG. 17. The accepted capped core feed tube 189 is shown terminating in a counterbored aperture 196 formed in a test fixture 197. In this embodiment, the test fixture 197 includes a first block 198 that is fixed to a housing 199 and is provided with a semi- cylindrical recess 201 having a radius equal to the radius of a perfectly capped core 48 (FIG. 11B). A second block 202 is mounted on a slide 203 for advancement toward and away from the fixed block 198. The second block 202 is provided with a corresponding semicylindrical recess 204, which, when the opposed surfaces of the blocks 198 and 202 are in engagement, forms a test bore or passageway 206 having a diameter equal to the diameter of a perfectly capped resistor core 48. The recesses 201 and 204 are slightly tapered at the end of the blocks 198 and 202 so that a conical guide portion 207 is formed for directing the capped cores 48 into the passageway 206. The armature 208 of a solenoid 209 is connected to the movable block 203 for reciprocating the movable block on the slide. If a distorted capped core 194 advances through the tube 189 to the testing fixture 197, the capped core is engaged by the conical guide portion 207 of the passageway 206. Upon actuation of the solenoid 209, the movable block 202 is advanced away from the fixed block 198, to permit the distorted capped core 194 to fully advance through the end of the feed tube 189 and drop into a feed tube 11 for passage to the receptacle 178.

In the operation of the test fixture 197, a distorted capped core 194 passes through the tube 189 and is retained in the conical guide portion 207 of the passageway 206. The next capped core fed through the tube 189 breaks the light beam of the photocell 191 for energizing certain of the control circuits shown in FIGS. 18 and 19. The control circuits are effective to energize the solenoid 209. The solenoid 209 retracts the movable block 202 whereby the distorted capped core 194 and the next successive capped core drop into the tube 211. The control circuit then deenergizes the solenoid 209 after a time delay sufficient to permit the two caps to drop from the passageway 206, whereupon the solenoid armature 208 advances the movable block 202 into engagement with the fixed block 198 to condition the test fixture 197 for operation on the next accepted capped core 48. An accepted capped core 48 that passes through the test fixture 197 advances through a second tube 212 to a pneumatic conveyor blower 213. Air pressure supplied to the blower 213 pushes the accepted capped core 48 through the second tube 212 to a storage receptacle or the next subsequent machine on the assembly line.

In the operation of certain deposited carbon resistor manufacturing assembly lines, a signalling component or magnetic slug 214 is fed into the assembly line for signalling or indicating the end of one manufacturing run and the beginning of the next subsequent run. The various resistor-making operations are performed on the slug as it is advanced through the assembly line. As the magnetic slug 214 is advanced through certain apparatus of the assembly line, magnetically responsive switches are actuated for controlling certain operations of the apparatus.

Figures 19, 20:
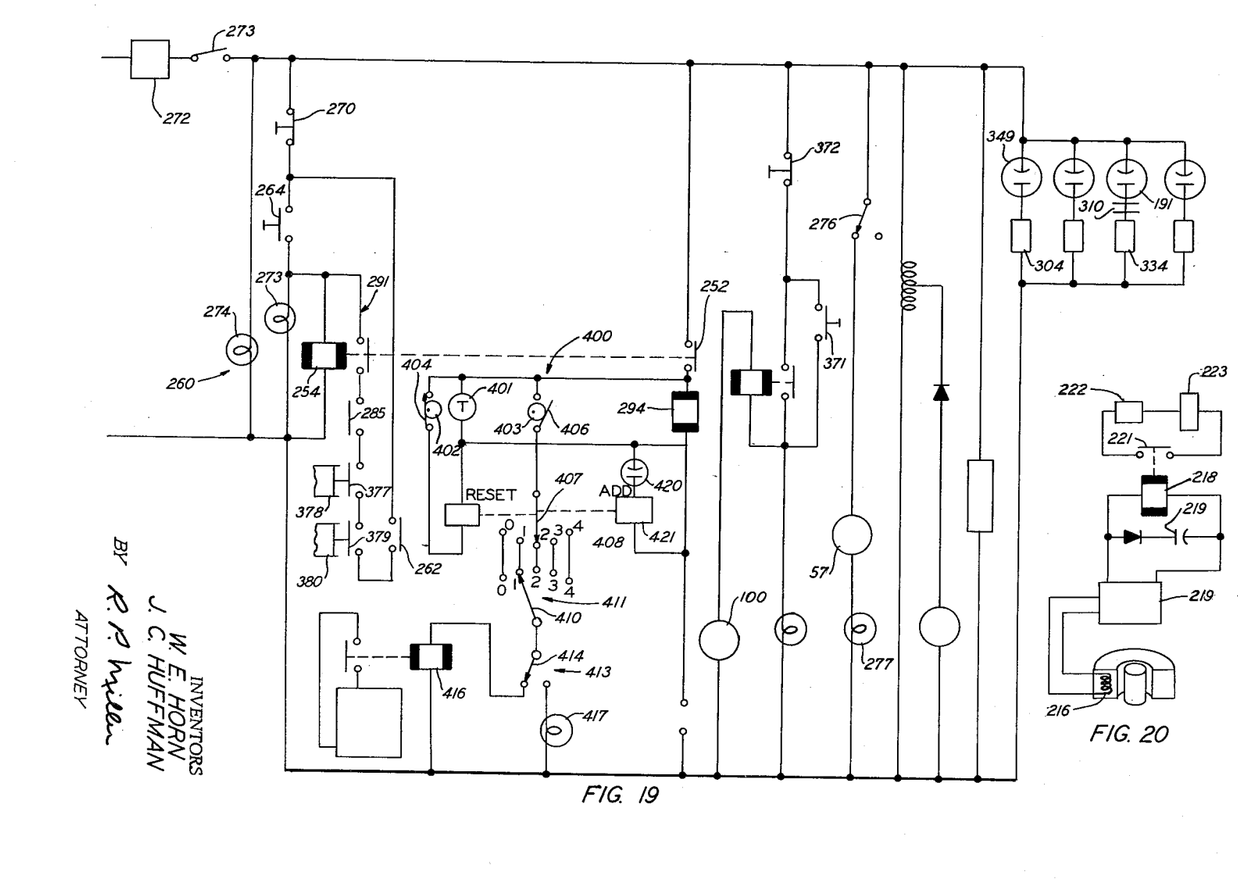

When the magnetic slug 214 is advanced into the capping apparatus, caps are forced onto each end of the slug in the same manner as caps are forced onto a non-magnetic resistor core or ceramic core 25. If the capping mechanism does not properly cap the magnetic slug 214, the slug is rejected by one of the above-described mechanisms and advanced into the rejected core discharge chute. It is necessary then, to introduce a previously capped magnetic slug into the accepted core chute so that a magnetic slug may continue to proceed through the resistor manufacturing line. Apparatus including a magnetically responsive coil 216 (FIGS. 3 and 20) mounted adjacent to the defective core discharge tube 49 is provided for this purpose. As the rejected magnetic slug 214 passes through the tube 49, the magnetic lines of force of the magnetic core induce a current in the coil 216 which produces a voltage drop across a flip-flop or multivibrator circuit 217 (FIG. 20). The multivibrator circuit 217 amplifies this voltage pulse and energizes a parallel connection of a relay 218 and a capacitor 219. Energization of the relay 218 draws up a contact 221. Closure of the contact 221 completes a circuit from a power supply 222 through the now closed contact and through a slug insert solenoid 223 (see also FIG. 17). The capacitor 219 discharges through the solenoid 223 to maintain the contact 221 drawn up for a predetermined time period.

Energization of the slug insert solenoid 223 actuates a slug insert armature 224. The armature advances a slug feed slide relative to a capped slug supply for advancing one capped magnetic slug 214 into a feed tube 227. The capped magnetic slug 214 advances through the feed tube, through a Y connection 228, and into the feed tube 212. The thus inserted magnetic slug 214 is then advanced by the pneumatic pusher 213 to the next subsequent machine on the assembly line.

An alternate embodiment of the automatic magnetic slug insert mechanism is also shown in FIG. 17. The alternate embodiment includes a vertically-disposed funnel 229 into which an operator may drop a capped magnetic slug 214 upon observing that a magnetic slug has been rejected and discharged through the rejected core discharge tube 49.

Electrical Control Apparatus

Figure 18:
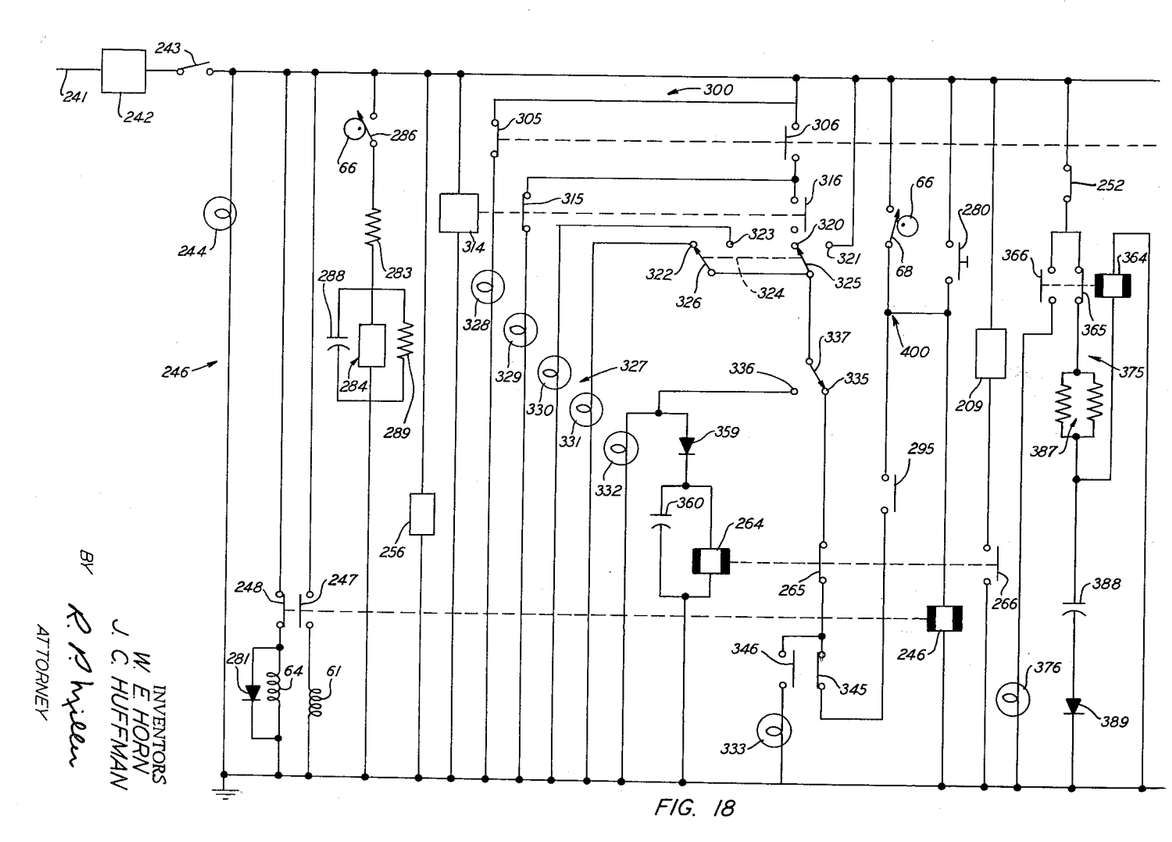
FIGS. 18, 19, and 20 are electrical schematic diagrams showing a preferred circuit for controlling the various operations of the capping mechanism.

Referring to FIG. 18, a first control circuit 240 is shown including a D.C. power supply 241 connected to a high-pass filter 242 which is connected in series with a D.C. power switch 243. Closure of the D.C. power switch 243 energizes a D.C. power indicating lamp 244 that is connected between the D.C. power switch and ground.

Closure of the main D.C. power switch 243 conditions another circuit that may be traced from the switch 243, through a normally open contact 247, and through a coil of the electromagnetic clutch 61 to ground. A relay 256 connected between the main D.C. power switch 243 and ground is also energized by the closure of the main D.C. power switch for conditioning for operation certain circuits of the A.C. control circuitry 260 shown in FIG. 19.

Referring now to FIG. 19, the A.C. control circuitry 260 is shown including a high-pass filter 272 connected to an A.C. power supply (not shown). A main A.C. power switch 273 is closed to complete a circuit which may be traced through the switch 273, and through an A.C. power indicating lamp 274. Closure of the main A.C. power switch 273 completes a circuit that may be traced through a toggle switch 276, through the windings of the drive motor 57, and through a drive motor indicating lamp 277 to ground.

It may be appreciated that although the drive motor 57 is energized and rotates the drive shaft 58, the Geneva drive shaft 82 is not rotated inasmuch as the clutch coil 61 connected in the D.C. control circuit 240 (FIG. 18) is not energized because the contact 247 is open and further because the electromagnetic brake 64 has not been de-energized by opening of a contact 248 to release the shaft.

Still referring to FIG. 18, it may be appreciated that an operator may press a pushbutton switch 280 to complete a circuit that may be traced from the main D.C. switch 243 through the switch 280, and through a relay 246 to ground. Energization of the relay 246 draws up the contact 247 for energizing the clutch coil 61. Energization of the relay 246 also opens the contact 248 for de-energizing the electromagnetic brake coil 64 which then permits the shaft 62 to rotate. At this time the rectifier 281 directs the flow of induced current caused by the collapse of the field of the brake coil 64 to ground.

Deenergization of the brake coil 64 and energization of the clutch coil 61 completes a driving connection between the main drive shaft 58 and the shaft 62 whereupon the cam 66 (FIG. 1) is rotated for cyclically closing the cam-operated switch 282 (FIG. 18).

Cyclic closure of the cam-actuated switch 282 applies a pulsing potential across the terminals of a resistor 283 and a parallel combination of a capicitor 288, a relay 284, and a resistor 289. The relay 284 is periodically energized and the capacitor 288 charged upon closure of the switch 282. It may be appreciated that during each periodic opening of the cam-operated switch 283, the capacitor 288 discharges through the coil of the relay 284 because the resistance of the resistor 289 exceeds the resistance of the relay coil 284. Because the cam-operated switch 282 is only momentarily opened during continuous rotation of the shaft 62, a voltage sufficient to energize the relay 284 is continuously applied to the relay by the discharging operation of the capacitor 288.

If, however, the capping heads 28, or other mechanical apparatus driven by the shaft 62, happens to jam and thereby prevent the shaft from rotating, the cam 66 maintains the switch 282 in its open position whereby the relay 284 is deenergized subsequent to the discharge of the capacitor 288. The relay 284 then releases a normally open contact 285 provided in the FIG. 19 control circuit 260 for opening an interlock circuit 292 which deenergizes the clutch coil 61 and energizes the brake coil 64. It was noted above that during the initial rotation of the shaft 62, the operator holds the push-button switch 280 closed for completing the circuit to the relay 246. A circuit (shown in FIG. 18 and generally indicated by the reference numeral 300), connected in parallel with the switch 280, is completed when resistor cores 25 are being properly fed through the core feed tubes 151, and 212 for applying a voltage across the relay 246. Assuming that the circuit 300 has been energized to apply a voltage across a normally open contact 295, and further assuming that the contact 295 is closed, a circuit is completed from the D.C. voltage source 241 through a series-connected contacts 306, 316, 320, 335, 265, and 345, through the closed contact 295, and through the relay 246 to ground. The relay 246 is thereby automatically energized so that the operator may release the pushbutton switch 280.

The circuit 300 includes the series-connected contacts 306, 316, 320, 335, 265, and 345, and a circuit connected in parallel with each of these contacts for energizing an indicating lamp 327. The contact 306 is controlled by a circuit that includes a photoelectric cell 349 (FIG. 19) that is mounted across the discharge feed tube 212 that supplies capped cores to the next resistor fabricating machine. When the next machine is operating at the same output speed as the capping mechanism, the photoelectric cell 349 is not blocked by resistors and thus conducts and energizes the relay 304 (FIG. 19). Energization of the relay 304 draws up the first normally open contact 306 (FIG. 18) of the series-connected contacts and opens a normally closed contact 305 connected in parallel with the contact 306. If a malfunction occurs in the next machine, the capped resistor cores back up in the feed tube and render the photoelectric cell 349 non-conductive thereby deenergizing the relay 304. Deenergization of the relay 304 opens the contact 306 and closes the contact 305 for lighting a warning lamp 328.

Assuming normal operation of the next machine, the contact 306 is closed and applies voltage across the terminals of the next normally open-series-circuit contact 316 (FIG. 18). The normally open contact 316 is actuated by a slug detector circuit 314 connected across the power supply 241 to ground. The slug detector circuit 314 is normally energized for drawing up the normally open contact 316 and opening a normally closed contact 315. At the above-mentioned times during the operation of the capping machine, a magnetic resistor core slug 214 is fed through the capping mechanism as the slug advances through the deposited carbon resistor assembly line for controlling certain operations of the assembly line. If the capping mechanism defectively caps the magnetic slug 214, the slug is rejected by the stripper mechanism 172 and advances through the reject tube 49. A magnetic sensing head (not shown) provided in the slug detector circuit 314 is energized by the passage of the defectively capped magnetic slug 214 through the reject tube 49. The sensing head is adapted to control the slug detector circuit 314 for opening the contact 316 and closing the contact 315 whereupon a slug reject lamp 329 is lit.

Assuming normal operation of the capping mechanism, the slug detector circuit 314 is energized to draw up the contact 316 whereby voltage is applied across contact arms 325 and 326 of a double-pole, double-throw panel switch 324. When the arms 325 and 326 of the double-pole panel switch are positioned by an operator at respective contacts 320 and 322, a circuit will be completed through the arm 325, through the arm 326, and through an indicating lamp 330 to ground. The indicating lamp 330 thereby lights to indicate that the switch 324 is in the "automatic" position.

When the arm 325 and 326 of the switch 324 are at contacts 321 and 323, the contacts 306 and 316 are bypassed, because the switch contact 321 is connected directly to the D.C. power supply 241. With the arms 325 and 326 so positioned, a circuit is completed from the main D.C. power switch 243, through the arms 325 and 326 and through a "manual" indicating lamp 331 to ground. In this manner, if it is desired to operate the capping mechanism irrespective of operation of the next machine or the slug detector circuit, the operator need only position the contact arms 325 and 326 at the manual contacts 321 and 323.

With the switch arm 325 in the manual position, a circuit is completed through the arm 325, and through a relay arm 337 to a contact 335. The arm 337 is controlled by the relay 334 (FIG. 19) which is in turn controlled by the photoelectric cell 191 (FIG. 19). If the test fixture 197 blocks the passage of a defectively capped resistor core, the photoelectric cell 191 is rendered non-conductive to energize a photocell amplifier circuit 310. The circuit 310 energizes the relay 334 which draws over the arm 337 into engagement with a contact 336. The contact 336 supplies power to energize a reject indicating lamp 332 that is connected in parallel with a rectifier 358. The rectifier 358 is connected in series with a 3-second time-delay network 359 that includes parallel connection of a capacitor 360 and a relay 264. Upon closure of the circuit to the contact 336, the capacitor 360 is charged and the relay 264 energized. Energization of the relay 264 closes a contact 266 for completing a circuit from the main power switch 243, through the solenoid 209, and through the contact 266 to ground. Energization of the solenoid 209 separates the blocks 198 and 203 of the gaging fixture 197 whereupon the defectively capped core 194 is removed from the capping mechanism. As the defective core 194 is thus removed, the photoelectric cell 191 is again rendered conductive to cause the photoamplifier circuit 310 to deenergize the relay 334. The relay 334 draws up the arm 337 to contact 335, thus opening the circuit through the relay 264, whereupon the capacitor C2 discharges for maintaining the solenoid 209 energized long enough to permit the defective core 194 to fully advance from the blocks 198 and 203 into the receptacle 178.

Energization of the relay 264 also opens the contact 265 for deenergizing the relay 246. Deenergization of the relay 246 is effective to stop the mechanical operation of the capping mechanism by releasing the normally closed contact 248 to energize the brake coil 64 and deenergizing the clutch coil 61.

Assuming that the caps 29 have been properly applied to the core 25, the arm 337 is positioned in engagement with the contact 335 and the contact 265 is closed. The series circuit is thus completed as far as the normally closed contact 345. The photoelectric cell 351 (FIG. 19) is placed across the core feed tube 151 so that under normal circumstances when an ample supply of cores is in the core feed tube, the photoelectric cell 351 is rendered non-conductive by the supply of cores. Thus, the relay 344 is normally deenergized so that the contact 345 is normally closed and the normally open contact 346 is open and not effective to light a "no core" lamp 333. If, however, the supply of cores depletes to a level below the photoelectric cell 351, the photoelectric cell is rendered conductive whereupon the relay 344 is energized to draw up the normally open contact 346 and the "no core" indicating lamp 333 is lit. Energization of the relay 344 also opens the contact 345 to open the series circuit.

Assuming normal operation of the entire apparatus that controls the series circuit contacts, the series circuit is completed for connecting the D.C. voltage supply 241 to the normally open A.C. interlock contact 295.

Referring to FIG. 19, there is shown a circuit for energizing a relay 294 that draws up the normally open A.C.–D.C. interlock contact 295. The relay 294 may be energized manually by the operator closing a pushbutton switch 369 which completes a circuit that may be traced from the A.C. high-pass filter 272 through an A.C. power switch 273, through a normally closed pushbutton switch 370, through the now closed pushbutton switch 369, and through a parallel combination of an indicating lamp 373 and a relay 254 to ground. Energization of the relay 254 opens a normally closed contact 252 for precluding operation of an "emergency" indicating circuit 375 shown in FIG. 18. Energization of the relay 254 draws up a contact 253 for completing a circuit from the A.C. switch 273, through the contact 252, through the relay 294, and through a normally open A.C.–D.C. interlock contact 257 to ground. Inasmuch as the D.C. power switch 243 (FIG. 18) has previously been closed for energizing the interlock relay 256, the contact 257 is drawn up. Thus the circuit through the relay 294 is completed when the contact 252 is drawn up so that the A.C.–D.C. interlock relay 294 is energized to draw up the A.C.–D.C. interlock contact 266.

Referring to FIG. 19, there is shown a holding circuit controlled by the capping machine mechanisms and connected in parallel with the pushbutton switch 269 so that the operator may release the switch 269. The holding circuit first includes the contact 255. Next, noting that during normal operation of the capping mechanism, the relay 284 (FIG. 18) is energized, the relay 284 draws up a contact 285 provided in series with the contact 255. A contact 377 of a pneumatically operated switch 378, connected in series with the contact 285, is closed when the pneumatic system is supplied with air pressure. A contact 379 of a vacuum-operated switch 380, connected in series with the contact 377, is also drawn up when the vacuum pump 103 reduces the pressure in the central vacuum bore 101 to a predetermined amount. Prior to the operator closing the pushbutton switch 269, the operator will have closed a pushbutton switch 371 for completing a circuit from the A.C. power switch 273, through a normally closed "stop" switch 372, through the now closed pushbutton switch 371, through a relay 384, and through the windings of a vacuum pump motor 100 to ground. Energization of the relay 384 draws up a normally open contact 385 to provide a holding circuit for the relay 384 which permits the operator to release the pushbutton switch 371. Operation of the vacuum pump motor 100 for a short period of time, as above-described, reduces the pressure in the central vacuum bore conduit 101 to a desired amount whereupon the switch contact 377 is drawn up. Because the main D.C. power switch 243 has been closed, as above-described, and the A.C.–D.C. interlock relay 256 has been energized to draw up a second normally open A.C.–D.C. interlock contact 258, the now closed contact 258 is connected in series with the contact 379 so that the pushbutton switch 269 holding circuit is completed, whereupon the operator may release the pushbutton switch 269.

In recapitulation, it is apparent that once the operator closes the switches 371, 369, and 280, the drive motor 57 is effective to drive the shaft 62 through the clutch 61 so long as the capping mechanism does not jam, or so long as other conditions, such as the loss of vacuum or air pressure, do not occur. Upon the occurrence of one of the above-mentioned conditions, the relay 254 holding circuit is opened to deenergize the relay 254. Deenergization of the relay 254 releases the contact 252 whereby the relay 294 is deenergized. Deenergization of the relay 294 opens the A.C.–D.C. interlock contact 295 (FIG. 18) which opens the circuit 300. At the end of the indexing cycle during which the vacuum is lost, the cam 66 is positioned by the drive shaft 62 for opening a cam-operated switch 68, which at all times during the indexing cycle is closed. Opening of the switch 68 opens a circuit to the relay 246 that may be traced through the switch 68, through a juncture point 400, and through the relay 246 to ground. The relay 246 is thus deenergized, whereupon the contact 247 is drawn up and the contact 248 is released. The open contact 248 thus deenergizes the clutch coil 61 whereas the contact 247 energizes the brake coil 64 for stopping rotation of the shaft 62.

Deenergization of the relay 254 also releases the normally closed contact 252 (FIG. 15) for completing the "emergency" indicating circuit 375. The "blink or emergency" circuit 375 energizes the relay 364 which opens the contact 365 and draws up a contact 366 to complete a circuit from the main D.C. power switch 243, through the closed contact 252, through the now closed contact 366, and through an "emergency" indicating lamp 376 to ground. Upon opening of the contact 365, a resistor 387, capacitor 388 combination, rectifier 389 are effective to direct the discharge of the capacitor 388 through the relay 364 to ground for maintaining the relay 364 energized for a short time interval. Upon completion of the discharge of the capacitor 388 and consequent deenergization of the relay 364, the contact 366 is released to deenergize the indicating lamp 376 and the contact 365 is closed whereupon the capacitor 388 and relay 364 are again energized. It may be appreciated that as long as the contact 252 is maintained closed, the "blink" circuit 375 is effective to apply a pulsed signal to the indicating lamp 376 so that the lamp will blink and thus indicate an emergency condition.

The control circuit shown in FIG. 19 further includes facilities for monitoring the operation of the capping mechanism to determine the number of cores 25 that are defectively capped and fed into the receptacle 178. A circuit provided for this purpose and generally indicated by the reference numeral 400, is energized upon closure of the contact 252. The circuit 400 includes a timer motor 401 connected in parallel with the relay 294. Energization of the timer motor 401 rotates a shaft (not shown) that positions cams 402 and 403 to respectively open and close cam-operated switches 404 and 406 according to a predetermined sequence. The cam 403 closes the cam-operated switch 406 for a predetermined time interval. The switch 406 is connected in series with a contact arm 407 of a step switch 408 or counter 408. Contacts 1 through 11 of the step switch 408 may be selectively connected to a contact arm 410 of a manually-positioned rotary switch 411 that is connected in series with a second manual switch 413. A contact arm 414 of the second manual switch 413 may be selectively positioned to connect the first manual switch 411 to either a relay 416 or an indicating lamp 417. During the time interval that the timer motor maintains the cam-operated switch 406 in its closed position to apply voltage to the contact arm 407, a photoelectric cell 216 (see also FIG. 3) is rendered non-conductive by defectively capped cores 194 that pass through the reject tube 49. Each time the photoelectric cell 216 is rendered non-conductive, an "add" coil 421 is actuated to step the contact arm 407 of the counter 408 to the next successive contact position. In this manner the contact arm of the counter 408 records the total number of rejected cores that pass through the reject tube. If (1) the contact arm 410 of the first manual switch 411 is set at position 4, for example, (2) the counter switch contact arm 407 has been advanced by the "add" circuit 421 to its contact 4, and (3) the duration of closure of cam-operated switch 406 has not elapsed, then it is apparent that a circuit is completed through the now closed contact 252, through the cam-operated switch 406, through the counter switch contact arm 407, across the contacts 4, and through the arm 410 of the first manual switch 411, whereupon either the relay 416 of the indicating lamp 417 is energized to apprise an operator that four defective cores have been produced by the capping machine during the predetermined time interval. If, however, the open time duration of switch 406 has elapsed prior to the advancement of the contact switch arm 407 to position 4, the cam-operated switch 406 will be open and the cam-operated switch 404 closed. Closure of the cam-operated switch 404 energizes a "reset" coil 422 that is connected in parallel with the timer motor 401. Energization of the reset coil 422 steps the counter switch-counter arm 407 back to position zero whereupon the switch 404 is opened and the switch 406 is closed by the timer 401 and cams 402 and 403 to commence a new timing period during which the number of rejects produced by the capping apparatus is again monitored.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an assembly device for forcing a cap onto each end of a component, indexing nest means for supporting the component, indexing chuck means aligned with the nest means for forcing a cap onto each end of the component, finger means for advancing a pair of caps into the chuck means, means actuated by the indexing chuck means for feeding components to the nest means, means operated by the feeding means for testing the alignment of the caps in the chuck means and accordingly controlling the passage of components to the nest means, leaf springs mounted on said nest means and flexed by the chuck means forcing caps onto the component for applying a force to the caps to hold the capped component in the nest means, cam means rendered effective during advancement of the indexing nest and chuck means for compressing the leaf spring means to release the capped component, trackway means for receiving the released capped component, separable gaging means interposed between the ends of the trackway means for precluding passage through the trackway means of a component having a distorted cap assembled therewith, and control means actuated by the precluded component for separating the separable gaging means to release and discharge the component from the trackway means.

2. In a device for assembling open-ended caps with a component, a carrier means having a nest for supporting a component, chuck means having a recess for receiving the closed end of a cap, a cap feed chute, a finger mounted for movement through the terminal end of the chute, means actuated by the chuck means for moving the finger to transfer a cap from the chute into the recess, a plate having an aperture formed therein, slide means mounted on the plate and operated by the carrier means for feeding components through the aperture into the nest, means for moving the chuck means to force the cap toward an end of the component in the nest, cap alignment testing means moved by the slide means into engagement with the cap received in the chuck means for ascertaining the orientation of said cap, cam means rendered effective by said testing means ascertaining a predetermined orientation of the engaged cap for interrupting advancement of said slide means, means rendered effective by movement of the chuck means toward the component for applying a force to test the bond between the cap and the component and to hold the capped component on the carrier, and stripper means for rendering ineffective said force applying means to release the capped component.

3. In an assembly device, a carrier support having a slot provided therein, a pair of plates slidably received in said slot for supporting an article, a pair of chucks for holding a pair of caps to be forced onto the ends of a supported article, chuck advancing means movable toward and away from said article for forcing said caps into engagement with said plates and onto said article to move the plates together, and means interposed between said plates for urging said plates against said caps whereby a cap loosely assembled on said article is removed therefrom upon movement of said chucks away from said article.

4. In a device for forcing a cap onto each end of a cylindrical article to produce a force-fit bond between each of said caps and said article, a carrier support having slots provided therein, a chuck mounted on each side of said carrier support for holding a cap so that the open end thereof extends outwardly therefrom, chuck advancing means for moving the caps inwardly toward each other, slide means positioned and advanced in said slot by said caps moving inwardly for supporting an article in position to receive on each end thereof one of said inwardly moving caps, and spring means flexed by said slide means advancing in said slots for applying a force tending to oppose the force-fit bond between said caps and said article.

5. In a device for forcing a cylindrical cap onto each end of a cylindrical component to produce a force fit bond between each of said caps and said component, an indexing carrier having slots provided therein, a chuck mounted on each side of said carrier for holding a cap so that the open end thereof extends outwardly therefrom, chuck advancing means for moving the caps inwardly toward the carrier, slide means advanced inwardly in said slot by said caps moving inwardly for supporting a component in position to receive on each end thereof one of said inwardly moving caps, spring means conditioned by said slide means advancing inwardly in said slots for urging the slide means outwardly into engagement with the caps to test the force fit bond between said caps and said article and hold the capped component on the carrier, cam means for advancing the slide means inwardly to release the capped and tested component, and a trackway for removing the released capped component from the slide means.

References Cited in the file of this patent

UNITED STATES PATENTS

| | | |
|---|---|---|
| 2,662,646 | McCain | Dec. 15, 1953 |
| 2,714,761 | Wampole | Aug. 9, 1955 |
| 2,761,659 | Burge et al. | Sept. 4, 1956 |
| 2,889,057 | Gartner | June 2, 1959 |
| 3,040,886 | Svenson | June 26, 1962 |
| 3,054,167 | Bryner et al. | Sept. 18, 1962 |